United States Patent
Kadota

[11] Patent Number: 5,855,519
[45] Date of Patent: Jan. 5, 1999

[54] BALL FIXED TYPE CONSTANT VELOCITY JOINT HAVING LOW ROTATIONAL BACKLASH

[75] Inventor: Tetsuro Kadota, Shizuoka-ken, Japan

[73] Assignee: NTN Corporation, Osaka, Japan

[21] Appl. No.: 773,214

[22] Filed: Dec. 23, 1996

[30] Foreign Application Priority Data

Dec. 26, 1995 [JP] Japan ................................ 7-339319

[51] Int. Cl.[6] ............................................ F16D 3/16
[52] U.S. Cl. ................................... 464/145; 464/906
[58] Field of Search ............................ 464/145, 141, 464/143, 146, 906

[56] References Cited

U.S. PATENT DOCUMENTS

| | | | |
|---|---|---|---|
| 2,006,026 | 6/1935 | Midthun | 464/906 X |
| 2,182,455 | 12/1939 | Smith | 464/145 |
| 4,358,283 | 11/1982 | Kumpar | 464/143 |
| 4,464,143 | 8/1984 | Bowyer | 464/906 X |
| 4,950,206 | 8/1990 | Jacob | 464/145 X |
| 5,230,659 | 7/1993 | Bird et al. | 464/906 X |

FOREIGN PATENT DOCUMENTS 637718  5/1950  United Kingdom ................. 464/145

*Primary Examiner*—Donald P. Walsh
*Assistant Examiner*—Emmanuel M. Marcelo
*Attorney, Agent, or Firm*—Nikaido, Marmelstein, Murray & Oram LLP

[57] ABSTRACT

A torsion spring received in a recess in an inner joint member is engaged at one end thereof with an engaging groove in a cage and at the other end with the wall surface of the recess, thereby constantly urging the cage against the inner joint member. As a result, a torque transmitting ball received in the pocket of the cage is elastically pressed against the narrow side (open side) of the wedge of the ball track by the cage, whereby the circumferential clearance between the guide groove and the torque transmitting ball disappears, preventing the rotation backlash of the joint.

5 Claims, 11 Drawing Sheets

BALL FIXED TYPE CONSTANT VELOCITY JOINT HAVING LOW ROTATIONAL BACKLASH

TECHNICAL FIELD

The present invention relates to a fixed ball type constant velocity joint and particularly to one which is suitable for applications where rotation backlash should be avoided.

RELATED ARTS

Constant velocity joints are classified roughly into two types: the ball fixed type constant velocity joint which allows only angular displacement between input and output shafts, and the slide type which allows angular displacement and axial displacement, and these types are selectively used according to particular applications and conditions of use.

What is shown as an example in FIGS. 15 and 16 is a Zepper type constant velocity joint which is typical of the ball fixed type constant velocity joint. This constant velocity joint comprises an outer joint member 11 having a plurality (normally 6) of curved guide grooves 11b axially formed in the inner surface 11a thereof, an inner joint member 12 having a plurality (normally 6) of curved guide grooves 12b axially formed in the outer surface 12a thereof, a plurality (normally 6) of torque transmitting balls 13 disposed in ball tracks defined by cooperation between the guide grooves 11b and 12b of the outer and inner joint members 11 and 12, and a cage 14 retaining the torque transmitting balls 13.

The respective centers A and B of the guide grooves 11b and 12b of the outer and inner joint members 11 and 12 are offset axially by the same distance in opposite directions (the center A offset toward the open side of the joint and the center B toward the innermost side) with respect to a joint center plane O including the centers of the torque transmitting balls 13. Therefore, the ball tracks defined by cooperation between the guide grooves 11b and 12b is wedge-shaped such that the innermost side of the ball track is narrowest and gradually enlarged toward the open side. The centers of the inner and outer spherical surfaces 11a and 12a of the outer and inner joint members 11 and 12 are located in the joint center plane O.

Since the ball tracks are wedge-shaped as described above, during torque transmission, forces are produced which tend to push out the torque transmitting balls 13, which tendency is counteracted by the cage 14 which is guided by the inner and outer surfaces 11a and 12a of the outer and inner joint members 11 and 12.

For example, as shown in FIG. 16, when the inner joint member 12 angularly moves through an angle θ with respect to the outer joint member 11, the cage 14 makes a slide swing in the clockwise direction as it is pushed by the torque transmitting ball 13 (the upper one in the figure), and the lower torque transmitting ball 13 which tends to be idle is guided to the left as seen in the figure, coming into contact with both of the guide grooves 11b and 12b. Thus, at any operating angle θ, the torque transmitting ball 13 guided by the cage 14 is positioned in the angle bisecting plane (θ/2); therefore, the nature of being constant in velocity for the joint is secured.

In this type of constant velocity joints, a slight clearance is held between the guide grooves and the torque transmitting balls to allow smooth angular change between the inner and outer joint members. As a result, during the change of the direction of rotation, rotation backlash (circumferential rattling) inevitably occurs in the joint. Because of such structural property, this type of constant velocity joints have not yet been employed in applications where rotation backlash should be avoided, e.g., a steering device for automobiles.

SUMMARY OF THE INVENTION

An object of the present invention is to solve the problem of rotation backlash which occurs in this type of constant velocity joints, and to provide ball fixed type constant velocity joint which is simple, light in weight, compact, and inexpensive.

To achieve said object, according to the invention, an elastic member is interposed between the inner and outer joint members, or between the cage and the torque transmitting balls, the elastic force from said elastic member being used to urge the torque transmitting ball toward the narrow side of a wedge of the ball track.

Constantly urging the torque transmitting ball toward the narrow side of the wedge of the ball track eliminates the circumferential clearance between the guide grooves of the inner and outer joint members and the torque transmitting balls, thus preventing the rotation backlash in the joint.

DESCRIPTION OF THE PREFERRED EMBODIMENTS

Figure 1A:
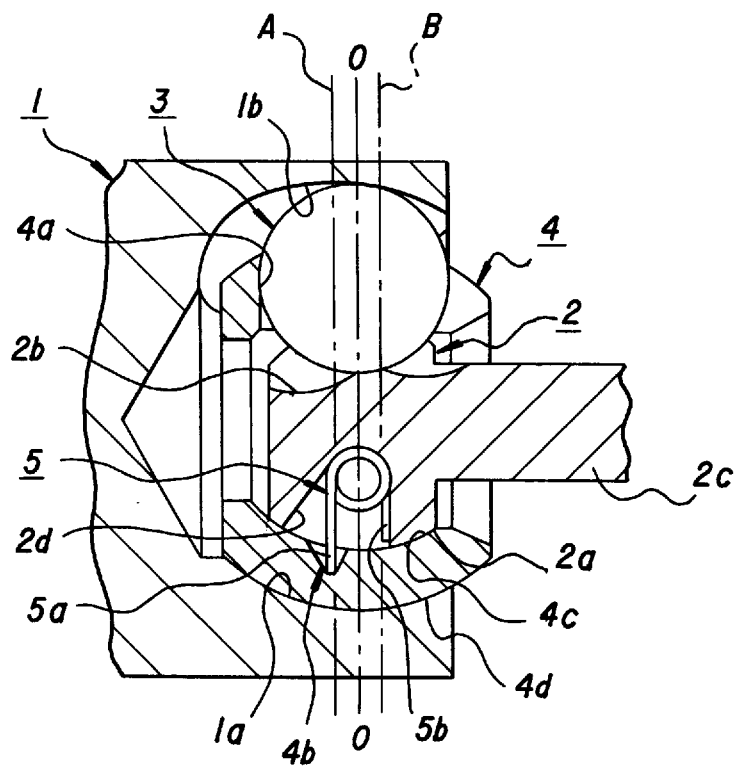
FIG. 1(a) is a longitudinal section showing a first embodiment of the invention.

Embodiments of the invention will now be described with reference to the drawings.

A ball fixed type constant velocity joint shown in FIGS. 1–4 is provided with a single torque transmitting ball. As shown in FIG. 1, the constant velocity joint in this embodiment comprises an outer joint member 1 having a single curved guide groove 1b axially formed in the inner surface 1a, an inner joint member 2 having a single curved guide groove 2b axially formed in the outer surface 2a, a single torque transmitting ball 3 disposed in a ball track defined by cooperation between the guide grooves 1b and 2b of the outer and inner joint members 1 and 2, a cage 4 having a single pocket 4a in which the torque transmitting ball 3 is held, and an elastic member, e.g., a torsion spring 5, interposed between the inner joint member 2 and the cage 4.

Figure 2:
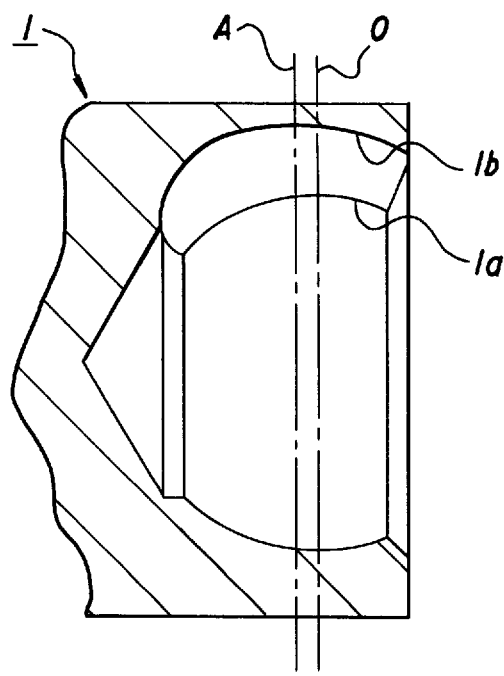
FIG. 2 is a longitudinal section of an outer joint member in FIG. 1.

As shown in FIG. 2, the outer joint member 1 is cup-shaped, opened at one end, with a shaft portion integrally formed on the other unillustrated end or a separate shaft portion joined thereto by suitable means. The center A of the guide groove 1b is offset axially by a predetermined distance toward the innermost portion from the joint center plane O including the center of the torque transmitting ball 3. The center of the inner spherical surface 1a is located in the joint center plane O.

Figure 3:
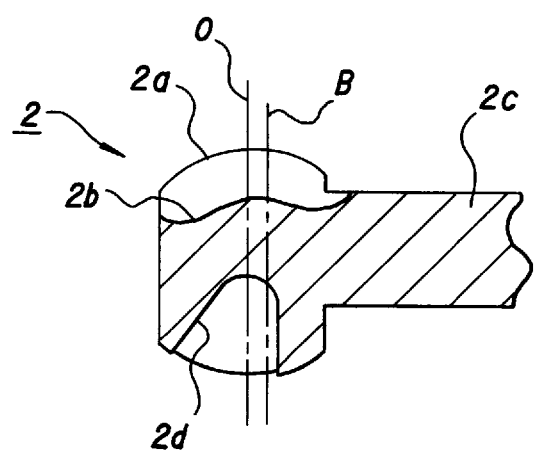
FIG. 3 is a longitudinal section showing an inner joint member in FIG. 1.

As shown in FIG. 3, in this embodiment, the inner joint member 2 is integral with the shaft portion 2c. This construction is adopted for reducing the number of parts and the number of man-hours involved in assembling operation. The center B of the guide groove 2b is offset axially by a predetermined distance toward the open side of the joint from the joint center plane O. This offset from the joint center plane O is the same in amount with the guide groove 1b but opposite in direction. Further, the inner joint member 2 is formed with a recess 2d for receiving the torsion spring 5.

Figure 4A:
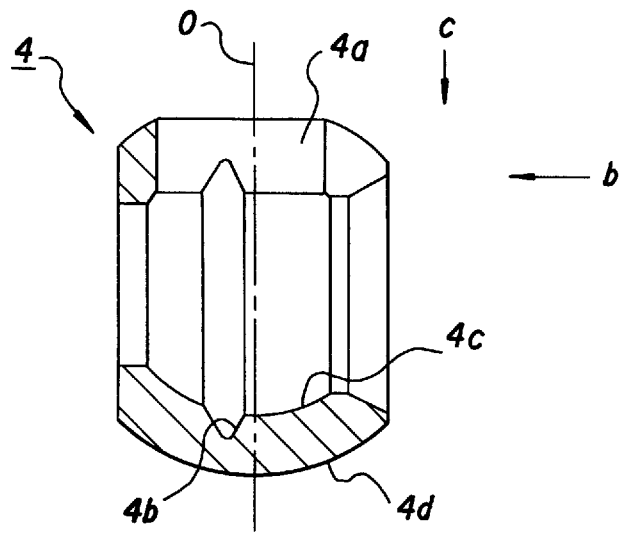
FIG. 4(a) is a longitudinal section of a cage in FIG. 1.
Figure 4B:
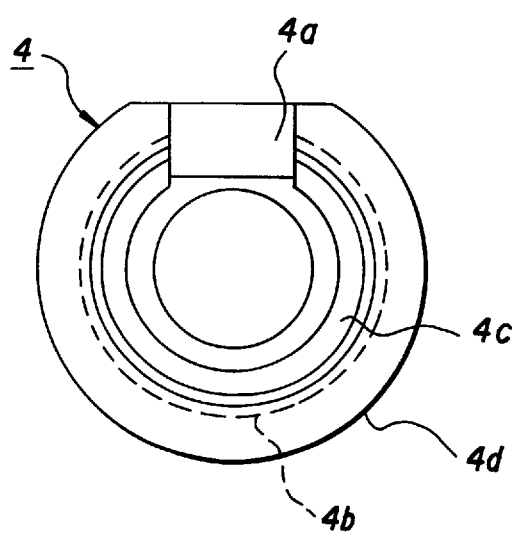
FIG. 4(b) is a view taken in the direction of arrow b in FIG. 4(a)
Figure 4C:
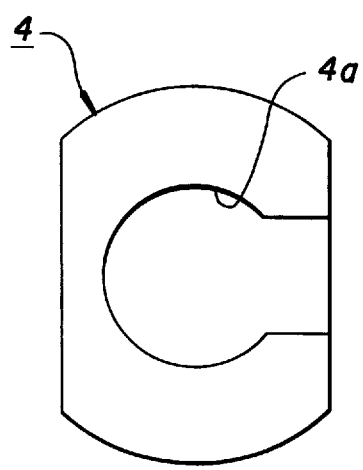
FIG. 4(c) is a view taken in the direction of arrow c in FIG. 4(a)

As shown in FIG. 4, in this embodiment, the pocket 4a of the cage 4 is window-shaped, opened at one end. The wall surface of the pocket 4 is a cylindrical surface, and the width of the opening of the pocket 4a is smaller than the diameter of the torque transmitting ball 3 to be received therein. Further, the inner surface 4c is formed with an engaging groove engaged by one end 5a of the torsion spring 5. The inner surface 4c and the center of the outer spherical surface 4d are both located in the joint center plane. In addition, the reason for opening one end of the pocket 4a is that the assembling operation for the inner joint member 2 integral with the shaft portion 2c as shown in FIG. 3 must be taken into account.

The cage 4 may be made of metallic material but it may also be made of resin material to provide light weight and low cost. As for resin materials for forming the cage 4, mention may be made of thermoplastic resins, such as polyamide (PA), polyacetal (POM), polyether sulfone (PES), popyether-ether ketone (PEEK), polyamide imide (PAI), polyether imide (PEI), polyphenylene sulfide (PPS), and thermoplastic polyimide, and thermosetting resins, such as phenol resin, and total aromatic polyimide (PI). However, when it is taken into account that it is desirable (1) that the material have good self-lubrication from the viewpoint of reducing slide resistance, (2) that the material be superior in mechanical properties, wear property and thermal properties, and (3) that the material be inexpensive and be superior in easy formability from the viewpoint of reducing production cost, it is considered that of these synthetic resins, particularly superior are polyamide resin (PA) and polyether-ether ketone (PEEK), and polyamide resin (PA), among other things, is considered particularly preferable. As for polyamides, use may be made of polyamide 6, polyamide 6-6, polyamide 4-6, polyamide 6-10, polyamide 6-12, and polyamide 11, and polyamide 12.

Further, to improve slide properties, said polyamide resin may have a fluoride type resin or the like incorporated therein. As for fluoride type resin, use may be made of polytetrafluoroethylene resin (PTFE), tetrafluoroethylene perfluoroalkylvinylether copolymer (PFA), tetrafluoroethylene ethylene copolymer (ETFE), polychlorotrifluoroethylene resin (PCTFE), and polyvinylfluoride resin (PVF). Among others, PTFE, PFA, FEP, and ETFE are desirable, and of these, PTFE, which is lowest in friction coefficient (dynamic friction coefficient 0.10) is particularly desirable.

Further, various fillers may be mixed within a range which does not reduce the effects of the present invention. As for fillers, examples are reinforcing materials, such as glass fiber, carbon fiber, aramid fiber, calcium titanate whisker, wollastonite, aluminum borate whisker, and calcium sulfate whisker, inorganic powders, such as molybdenum disulfide, graphite, carbon, calcium carbonate, talc, mica, kaolin, iron oxide, glass bead, and phosphate compounds, resin powders, such as polyimide resin, aromatic polyester resin, polyether ketone resin, polyphenylene sulfide resin, and silicone resin, and internal lubricants, such as silicone oil, fluoride oil, wax, stearate compounds.

Figure 1B:
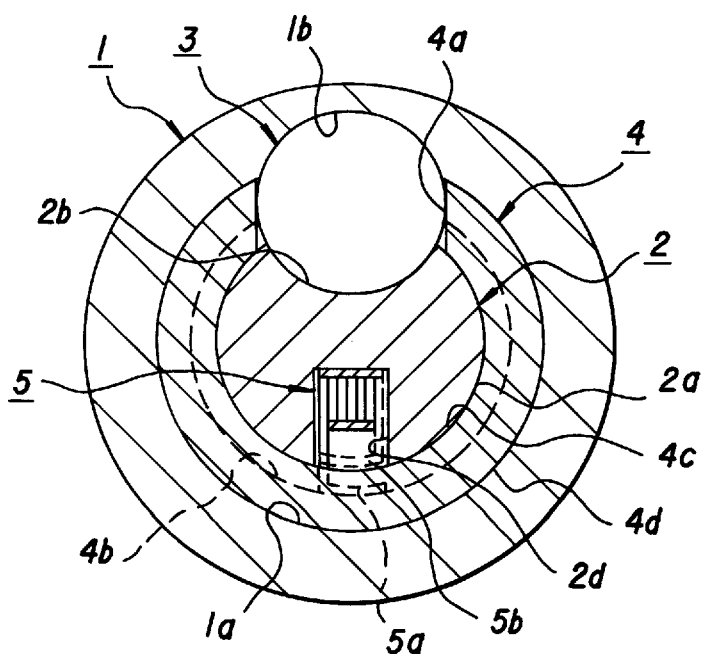
FIG. 1(b) is a cross section taken along the line O—O in FIG. 1(a)
Figure 5A:
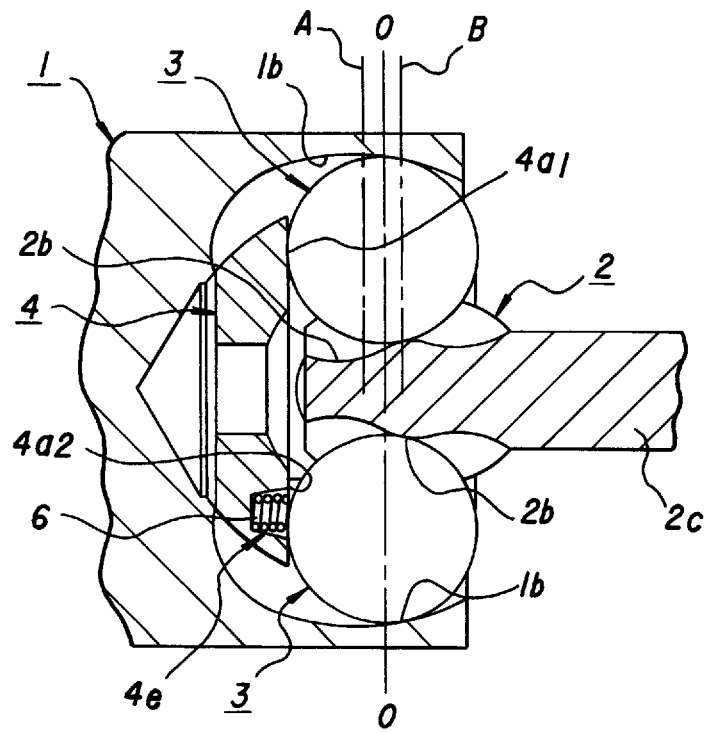
FIG. 5(a) is a longitudinal section showing a second embodiment of the invention.

The outer joint member 1, inner joint member 2, torque transmitting ball 3, cage 4 and torsion spring 1 are assembled in the manner shown in FIG. 5. Since the center A of the guide groove 1b of the outer joint member 1 and the center B of the guide groove 2b of the inner joint member 2 are offset with respect to the joint center plane O axially by the same distance in opposite directions, the ball track defined by cooperation between the guide grooves 1b and 2b is wedge-shaped, narrowed at the open side and gradually enlarged toward the innermost portion. Further, the torsion spring 5 received in the recess 2d in the inner joint member 2 is engaged at one end 5a thereof (as shown in FIG. 1(b), bent in L-shape) with the engaging groove 4b of the cage 4 and at the other end 5b thereof (as shown in FIG. 1(b), bent in L-shape) with the wall surface of the recess 2d, thereby elastically urging the cage 4 against the inner joint member 2 at all times. In this embodiment, the elastic force of the torsion spring 5 acts in the direction to swing the cage 4 clockwise as seen in FIG. 1(a). As a result, the torque transmitting ball 3 received in the pocket 4a of the cage 4 is constantly elastically urged by the cage 4 toward the narrow side (open side) of the wedge of the ball track, whereby the circumferential clearance between the guide grooves 1b, 2b and the torque transmitting ball 3 disappears, preventing the rotation backlash of the joint. At the same time, whenever the outer and inner joint members angularly displace, the torque transmitting ball 3 is held in the angle bisecting plane (θ/2) of the operating angle θ; thus, the nature of the joint of being constant in velocity is secured.

In addition, in the case where the ball track is to be made wedge-shaped such that it is narrowed in the innermost portion and gradually enlarged toward the open side as in the prior art, the torsion spring 5 will be adapted to exert its elastic force in the direction opposite to the one described above, i.e., exert in the direction to swing the cage 4 counterclockwise as seen in FIG. 1(a), whereby the same effect as the above can be obtained. Further, in this embodiment, the torsion spring 5 has been interposed between the inner joint member 1 and the cage 4; however, it may be interposed between the outer joint member 1 and the cage 4 according to the arrangement of the embodiment. The torsion spring 5 may be replaced by other elastic means (resin material, rubber material, etc.).

A ball fixed type constant velocity joint shown in FIGS. 5 through 8 has two torque transmitting balls. As shown in FIG. 5, the constant velocity joint in this embodiment comprises an outer joint member 1 having two curved guide grooves 1b axially formed in the inner surface la, an inner joint member 2 having two curved guide grooves 2b axially formed in the outer surface 2a, two torque transmitting balls 3 disposed in ball tracks defined by cooperation between the guide grooves 1b and 2b of the outer and inner joint members 1 and 2, a cage 4 having pockets 4a1 and 4a2 in which the torque transmitting balls 3 are held, and an elastic member, e.g., a torsion spring 6, interposed between the cage 4 and the torque transmitting balls 3.

Figure 6:
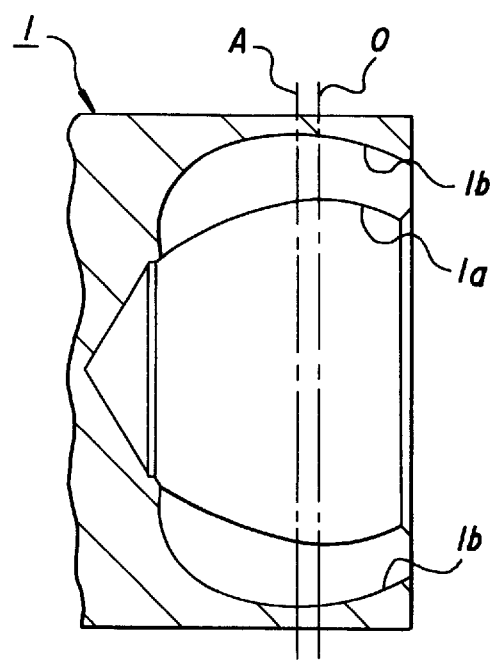
FIG. 6 is a longitudinal section of the outer joint member in FIG. 5.

As shown in FIG. 6, the outer joint member 1 is cup-shaped, opened at one end, with a shaft portion integrally formed on the other unillustrated end or a separate shaft portion joined thereto by suitable means. The center A of the guide grooves 1b is offset axially by a predetermined distance toward the innermost portion from the joint center plane O. The two guide grooves 1b are formed at 180°-opposite positions. The center of the inner spherical surface la is located in the joint center plane O.

Figure 7:
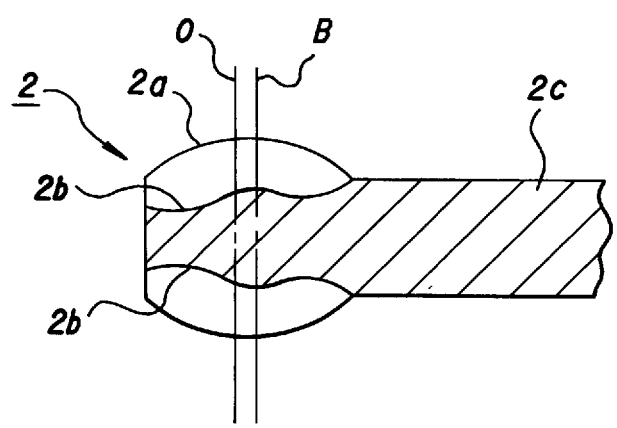
FIG. 7 is a longitudinal section of the inner joint member in FIG. 5.

As shown in FIG. 7, in this embodiment also, the inner joint member 2 is integral with the shaft portion 2c. The center B of the guide grooves 2b is offset axially by a predetermined distance toward the innermost portion from the joint center plane O . This offset from the joint center plane O is the same in amount with the guide grooves 1b of the outer joint member 1 but opposite in direction. The two guide grooves 1b are formed at 180°-opposite positions. The center of the inner spherical surface 1a is located in the joint center plane O.

Figure 8A:
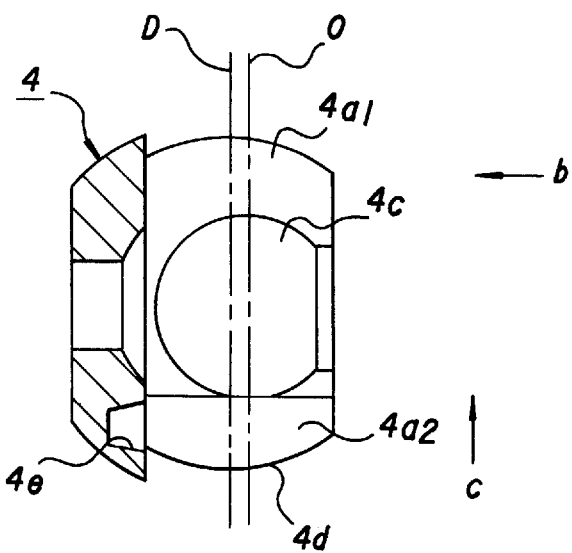
FIG. 8(a) is a longitudinal section of a cage in FIG. 5.
Figure 8B:
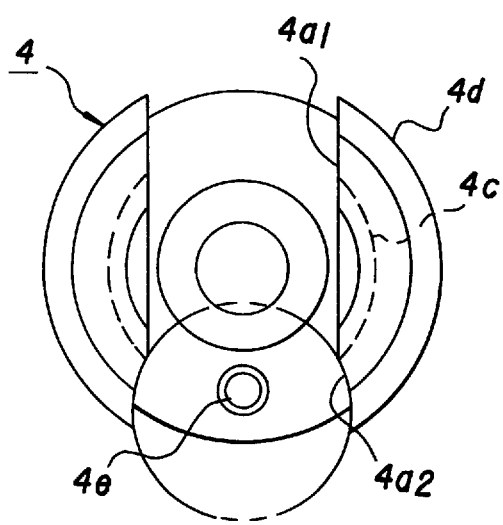
FIG. 8(b) is a view taken in the direction of arrow b in FIG. 8(a)
Figure 8C:
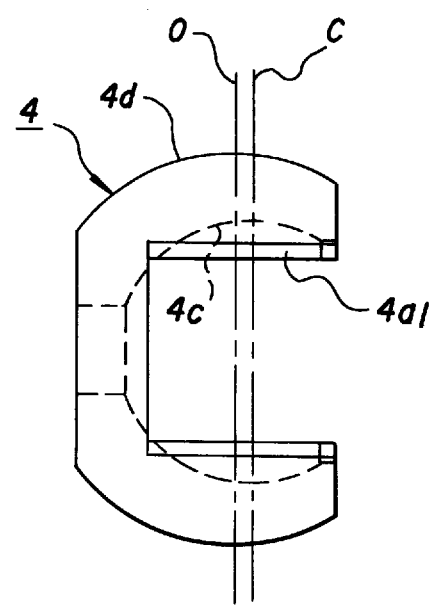
FIG. 8(c) is a view taken in the direction of arrow c in FIG. 8(a)

As shown in FIG. 8, in this embodiment, the pockets 4a1 and 4a2 of the cage 4 are comb-shaped, opened at one end. The wall surfaces (bottom wall surface and opposite lateral wall surfaces) of the pocket 4a1 are flat, but as shown in (b) of same figure, as to the pocket 4a2, the bottom wall surface is flat and the opposite lateral wall surfaces are cylindrical. Further, as shown in(a) and (c) of the same figure, the spherical center C of the inner surface (the concave spherical portion formed internally of the comb portion) 4c and the center D of the outer spherical surface 4d are offset axially by the same distance in opposite direction with respect to the joint center plane O. Further, the bottom surface of the pocket 4a2 is formed with a recess 4e for receiving a coil spring 6. In addition, the reason for making the pockets 4a1 and 4a2 comb-shaped is that the operation for assembling the inner joint member 2 integral with the shaft portion 2c must be taken into account.

The outer joint member 1, inner joint member 2, torque transmitting balls 3, cage 4 and coil spring 6 are assembled in the manner shown in FIG. 5. Since the center A of the guide grooves 1b of the outer joint member 1 and the center B of the guide grooves 2b of the inner joint member 2 are offset with respect to the joint center plane O axially by the same distance in opposite directions, the ball tracks defined by cooperation between the guide grooves 1b and 2b are wedge-shaped, narrowed at the open side and gradually enlarged toward the innermost portion. Further, the coil spring 6 elastically urges the torque transmitting ball 3 received in the pocket 4a2 toward the narrow side (open side) of the wedge of the ball track at all times. Thereby, the circumferential clearance between the guide grooves 1b, 2b and the torque transmitting ball 3 disappears, preventing the rotation backlash of the joint.

Figure 5B:
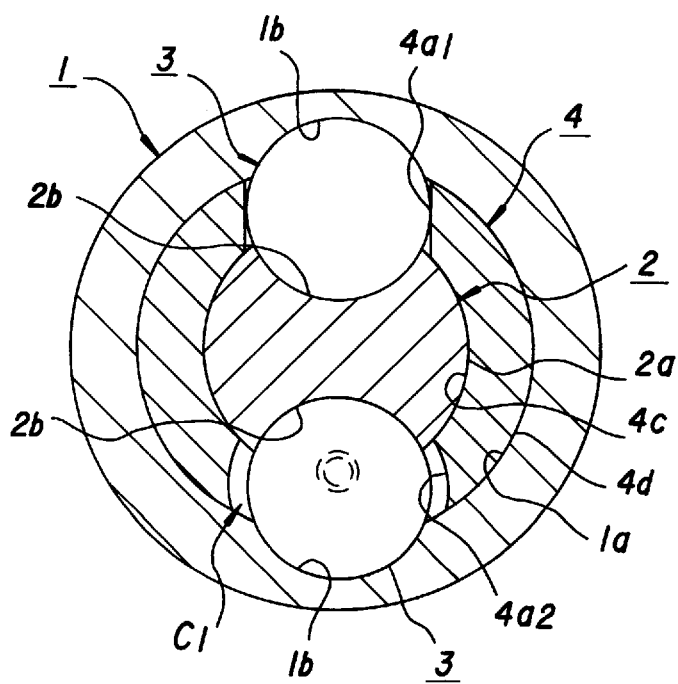
FIG. 5(b) is a cross section taken along the line O—O in FIG. 5(a)

As shown in FIG. 5(b), a circumferential pocket clearance C1 is provided between the pocket 4a2 and-the torque transmitting ball 3, this arrangement being intended to cope with a pitch variation (circumferential pitch variation) when the torque transmitting ball 3 moves along the ball track. Further, as described above, in this embodiment, the center C of the inner spherical surface 4c and the center D of the outer spherical surface 4d of the cage 4 are offset in opposite directions with respect to the joint center plane O. This is for the purpose of regulating the degree of freedom of the cage 4 (in FIG. 5(b), the cage 4 is swingable around an axis connecting the centers of the two torque transmitting balls 3) by the deviation between the spherical centers C and D and preventing fluctuation of the cage 4 during rotation of the joint. Such offset of the cage 4 may be applied to the cage in the embodiment shown in FIG. 1.

In addition, in this embodiment, the coil spring 6 has been installed in the pocket 4a2 alone; however, such coil spring may also be installed in the pocket 4a1, so as to allow the two torque transmitting balls 3 to be urged by their respective coil springs. Further, the coil spring 6 may be replaced by other elastic means.

Figure 9A:
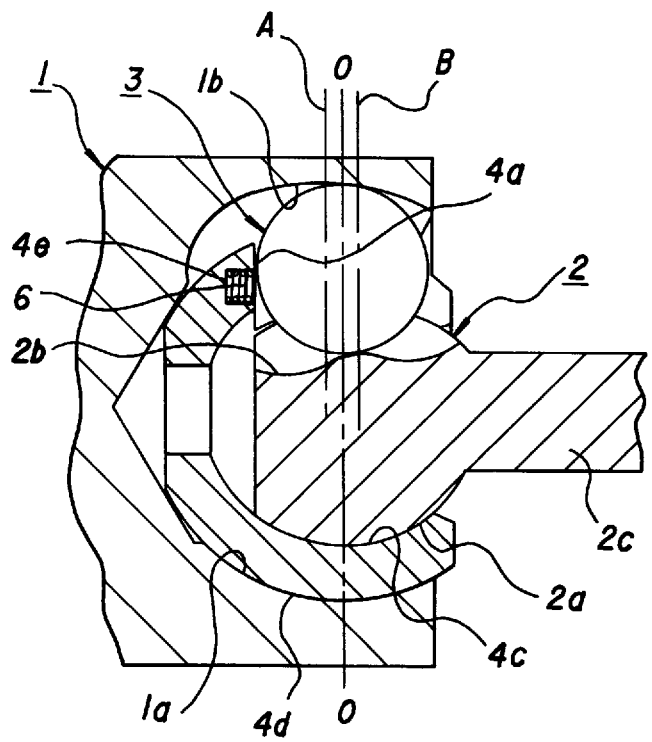
FIG. 9(a) is a longitudinal section showing a third embodiment of the invention.
Figure 9B:
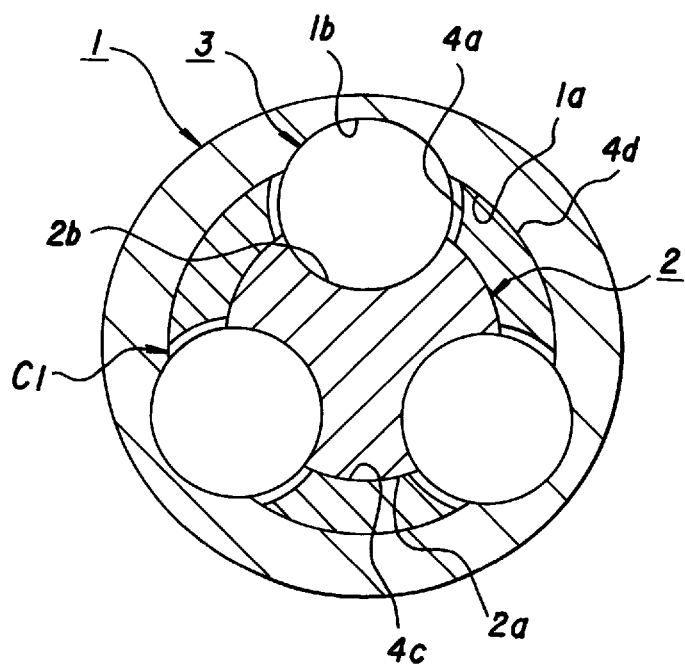
FIG. 9(b) is a cross section taken along the line O—O in FIG. 9(a)

An embodiment shown in FIGS. 9 through 12 has three torque transmitting balls, but the basic idea is the same as in FIG. 5. As shown in FIG. 9, the constant velocity joint of this embodiment comprises an outer joint member 1 having three curved guide grooves 1b axially formed in the inner surface 1a, an inner joint member 2 having three curved guide grooves 2b axially formed in the outer surface 2a, three torque transmitting balls 3 disposed in ball tracks defined by cooperation between the guide grooves 1b and 2b of the outer and inner joint members 1 and 2, a cage 4 having three pockets 4a in which the torque transmitting balls 3 are held, and elastic members, e.g., coil springs 6, interposed between the cage 4 and the torque transmitting balls 3.

Figure 10:
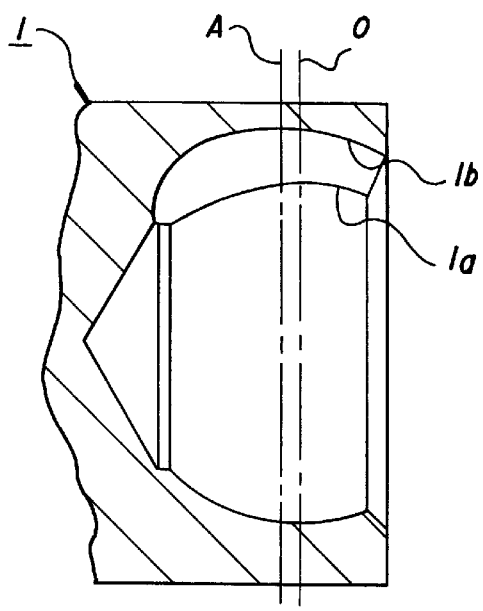
FIG. 10 is a longitudinal section of the outer joint member in FIG. 9.
Figure 11:
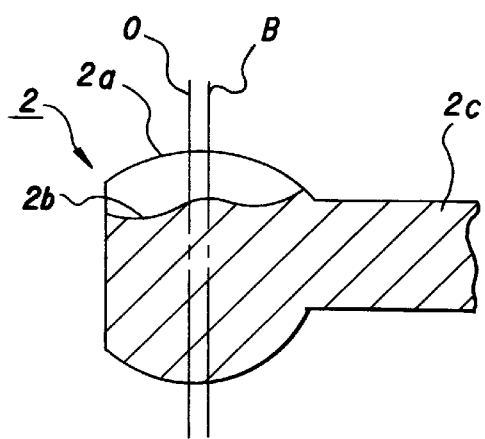
FIG. 11 is a longitudinal section of the inner joint member in FIG. 9.

As shown in FIG. 10, the outer joint member 1 is cup-shaped, opened at one end, with a shaft portion integrally formed on the other unillustrated end or a separate shaft portion joined thereto by suitable means. The center A of the guide grooves 1b is offset axially by a predetermined distance toward the innermost portion from the joint center plane O. The three guide grooves 1b are circumferentially equispaced. The center of the inner spherical surface 1a is located in the joint center plane O. As shown in FIG. 11, in this embodiment also, the inner joint member 2 is integral with the shaft portion 2c. The center B of the guide grooves 2b is offset axially by a predetermined distance toward the open side from the joint center plane O. This offset from the joint center plane O is the same in amount with the guide grooves 1b of the outer joint member 1 but opposite in direction. The three guide grooves 1b are circumferentially equispaced. The center of the outer spherical surface 2a is located in the joint center plane O.

Figure 12A:
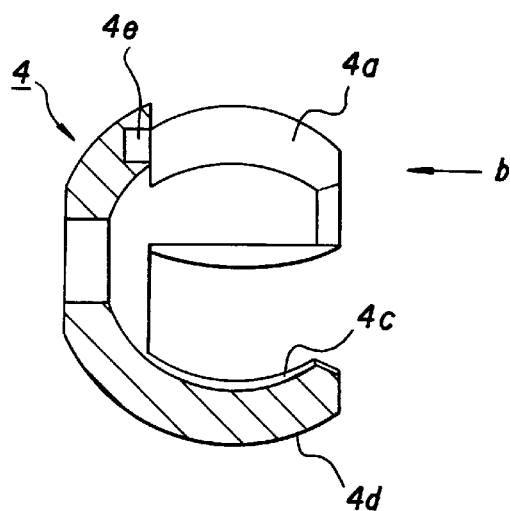
FIG. 12(a) is a longitudinal section of a cage in FIG. 9.
Figure 12B:
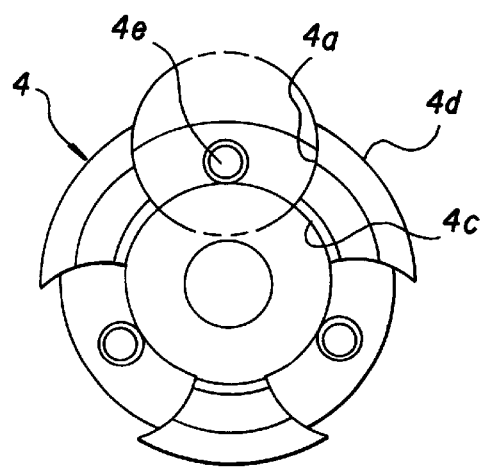
FIG. 12(b) is a view taken in the direction of arrow b in FIG. 12(a)

As shown in FIG. 12, in this embodiment, each pocket 4a of the cage 4 is comb-shaped, opened at one end. The bottom wall surface of the pocket 4a is flat, and the opposite lateral wall surfaces are cylindrical. The center of the inner spherical surface and the center of the outer spherical surface 4c and 4d are located in the joint center plane O. Further, the bottom wall surface of each pocket 4c is formed with a recess 4e to receive a coil spring 6, as shown in FIG. 9(a). In addition, in this embodiment also, the center of the inner spherical surface 4c and the center of the outer spherical surface 4d of the cage 4 may be offset in opposite directions with respect to the joint center plane O.

The outer joint member 1, inner joint member 2, torque transmitting balls 3, cage 4 and coil springs 6 are assembled in the manner shown in FIG. 9. Each coil spring 6 elastically urges the torque transmitting ball 3 received in each pocket 4a toward the narrow side (open side) of the wedge of the ball track at all times. Thereby, the circumferential clearance between the guide grooves 1b, 2b and the torque transmitting ball 3 disappears, preventing the rotation backlash of the joint.

Figure 13B:
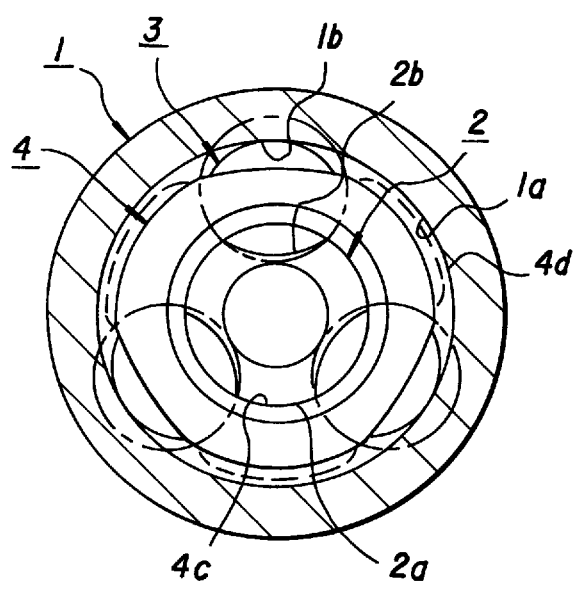
FIG. 13(b) is a cross section taken along the line O—O in FIG. 13(a)
Figure 13A:
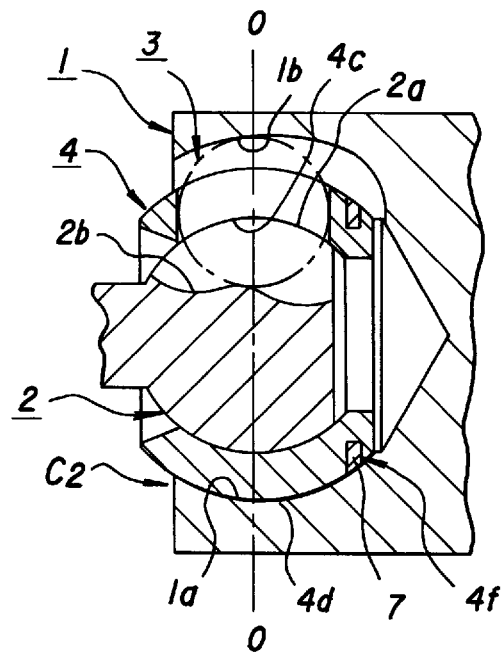
FIG. 13(a) is a longitudinal section showing a fourth embodiment of the invention.

An embodiment shown in FIG. 13 has three torque transmitting balls. The constant velocity joint of this embodiment comprises an outer joint member 1 having three curved guide grooves 1b axially formed in the inner surface 1a, an inner joint member 2 having three curved guide grooves 2b axially formed in the outer surface 2a, three torque transmitting balls 3 disposed in ball tracks defined by cooperation between the guide grooves 1b and 2b of the outer and inner joint members 1 and 2, a cage 4 for retaining the torque transmitting balls 3, and an elastic member, e.g., a C-shaped spring (split ring) 7, interposed between the outer joint member 1 and the cage 4. Each ball track, as in the preceding embodiments, is wedge-shaped, narrowed in the innermost portion and gradually enlarged toward the open side.

The C-shaped spring 7 is fitted in a circumferential groove 4f formed in the outer surface 4d of the cage 4 and is pressed against the inner spherical surface 1a of the outer joint member 1 by its diameter-expanding elastic force. Further, an axial clearance C2 is defined between the inner surface 1a of the outer joint member 1 and the outer surface 4d of the cage 4 to allow the axial displacement of the cage 4 and inner joint member 2. The clearance between the inner surface 4c of the cage 4 and the outer surface 2a of the inner joint member 2 is approximately the same as the ordinary guide clearance.

When the C-shaped spring 7 is pressed against the inner spherical surface 1a of the outer joint member 1, the diameter-expanding elastic force of the C-shaped spring 7 provides an axial force component which tends to press the cage 4 and inner joint member 2 as a unit toward the open side. The cage 4 and inner joint member 2, under this axial force component, are axially displaced toward the open side within the range of the axial clearance with respect to the outer joint member 1. As a result, the torque transmitting balls 3 are elastically urged toward the narrow side (open side) of the wedge of the ball track at all times. Thereby, the circumferential clearance between the guide grooves 1b, 2b and the torque transmitting balls 3 disappears, preventing the rotation backlash of the joint.

Figure 14B:
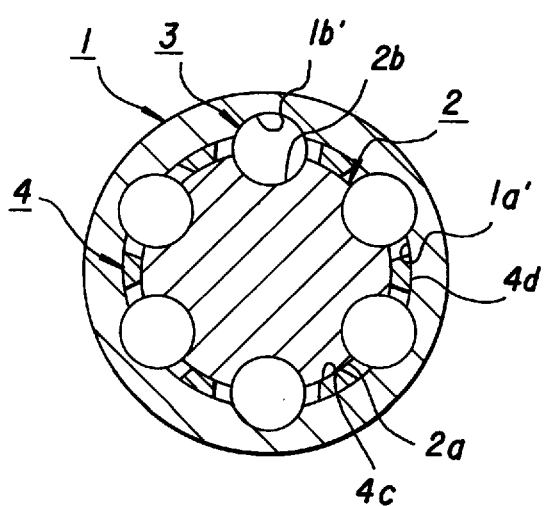
FIG. 14(b) is a cross section taken along the line O—O in FIG. 14(a)
Figure 14A:
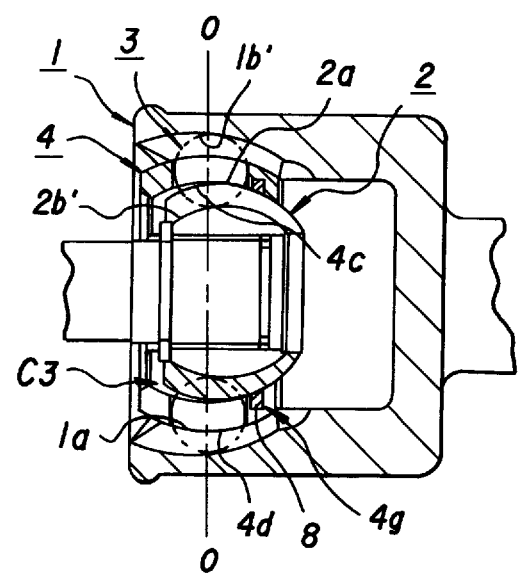
FIG. 14(a) is a longitudinal section showing a fifth embodiment of the invention.
Figure 15A:
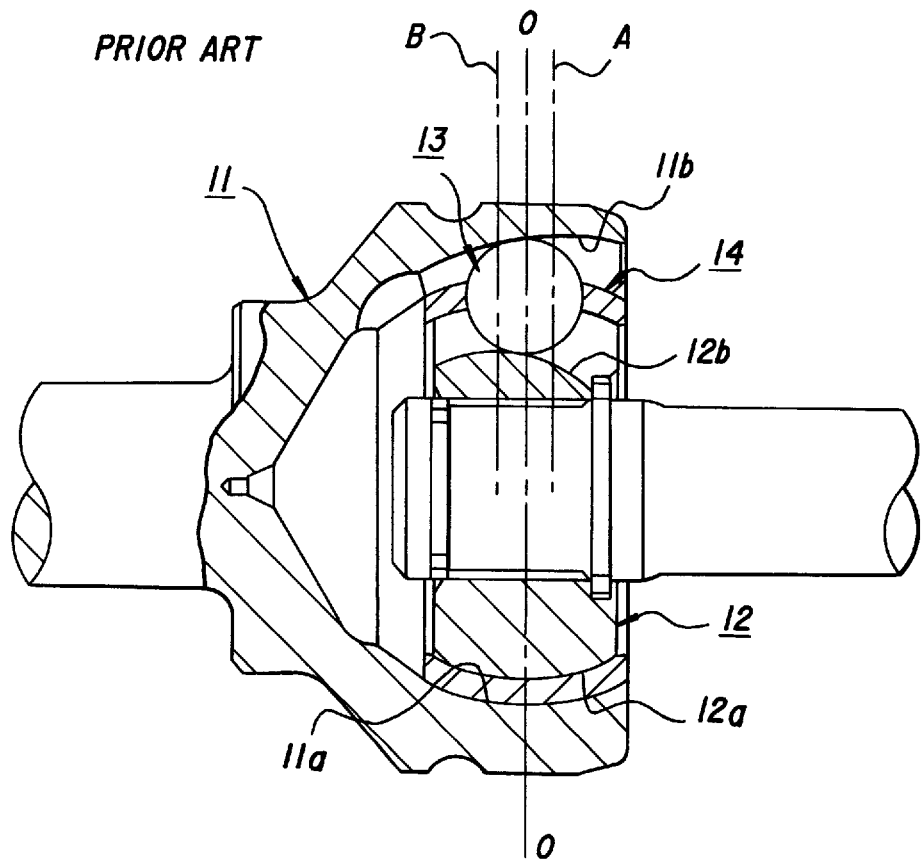
FIG. 15(a) is a longitudinal section showing a conventional ball fixed type constant velocity joint.
Figure 15B:
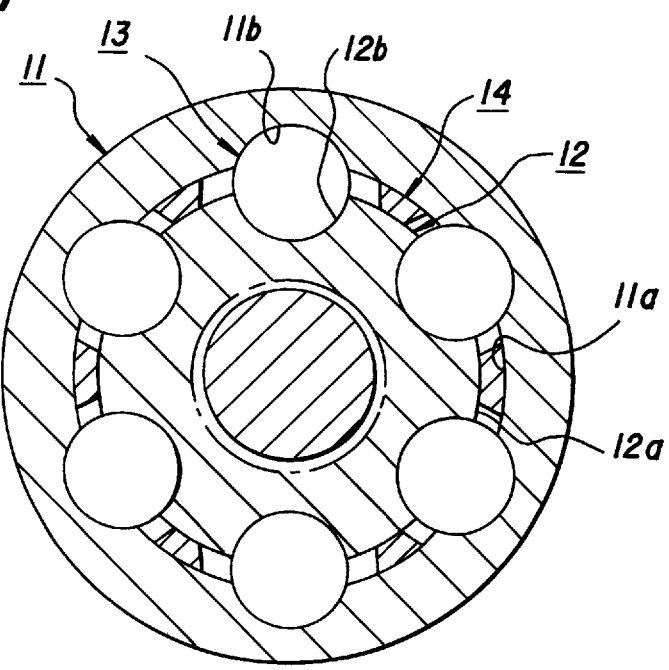
FIG. 15(b) is a cross section taken along the line O—O in FIG. 15.(a)
Figure 16:
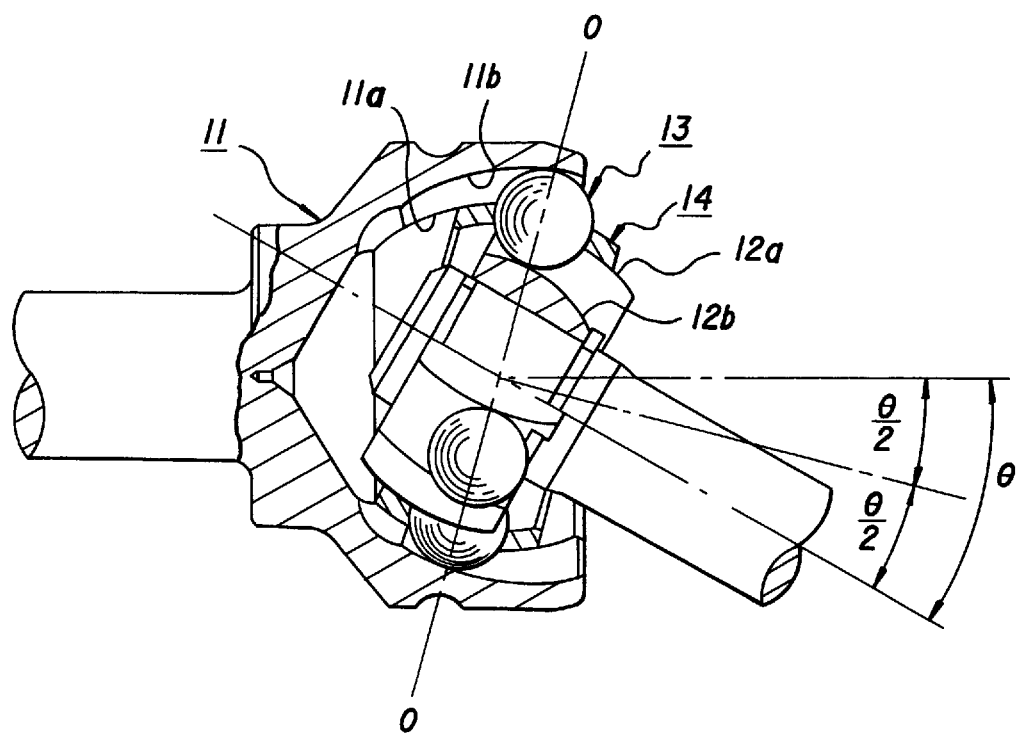
FIG. 16 is a longitudinal section showing a state in which the conventional ball fixed type constant velocity joint shown in FIG. 15 takes an operating angle θ.

An embodiment shown in FIG. 14 has six torque transmitting balls. The constant velocity joint of this embodiment comprises an outer joint member 1 having six curved guide grooves 1b axially formed in the inner surface 1a, an inner joint member 2 having six curved guide grooves 2b axially formed in the outer surface 2a, six torque transmitting balls 3 disposed in ball tracks defined by cooperation between the guide grooves 1b and 2b of the outer and inner joint members 1 and 2, a cage 4 for retaining the torque transmitting balls 3, and an elastic member, e.g., a C-shaped spring (split ring) 8, interposed between the inner joint member 2 and the cage 4. Each ball track, as in the conventional arrangement shown in FIG. 15, is wedge-shaped, narrowed in the innermost portion and gradually enlarged toward the open side.

The C-shaped spring 8 is fitted in a circumferential groove 4g formed in the inner surface 4c of the cage 4 and is pressed against the outer spherical surface 2a of the inner joint member 2 by its diameter-contracting elastic force. Further, an axial clearance C3 is defined between the outer surface 2 of the inner member 2 and the inner surface 4c of the cage 4 to allow the axial displacement of the cage 4 and outer joint member 2. The clearance between the outer surface 4d of the cage 4 and the inner surface 1a of the outer joint member 1 is approximately the same as the ordinary guide clearance.

When the C-shaped spring 8 is pressed against the outer spherical surface 2a of the inner joint member 2, the diameter-contracting elastic force of the C-shaped spring 8 provides an axial force component which tends to press the inner joint member 2 toward the open side. The cage 4 and outer joint member 2, under this axial force component, are axially displaced within the range of the axial clearance C3 toward the side opposite to the open side with respect to the inner joint member 2. As a result, the torque transmitting balls 3 are elastically urged toward the narrow side (open side) of the wedge of the ball track at all times. Thereby, the circumferential clearance between the guide grooves 1b, 2b and the torque transmitting balls 3 disappears, preventing the rotation backlash of the joint.

What is claimed is:

1. A ball fixed type constant velocity joint comprising:

an outer joint member having a first curved guide groove axially formed in an inner spherical surface thereof;

an inner joint member having a second curved guide groove axially formed in an outer spherical surface thereof;

one torque transmitting ball disposed in one ball track defined by cooperation between the guide grooves;

a cage having one pocket for retaining the torque transmitting ball, an inner spherical surface thereof being in spherical contact with the outer spherical surface of the inner joint member, an outer spherical surface thereof being in spherical contact with the inner spherical surface of the outer joint member; and an elastic member interposed between the inner spherical surface of the cage and the outer spherical surface of the inner joint member, the elastic member elastically pushing the cage with respect to the inner joint member in a direction to swing the cage in a plane including an axis of the joint, wherein the centers of said first and second guide grooves are offset axially by a same distance in opposite directions with respect to a joint center plane including a center of the torque transmitting ball, so that the ball track is wedge-shaped and gradually narrows toward one side in the axial direction, the torque transmitting ball in the pocket of the cage and the ball track being constantly elastically urged toward the narrow side of the ball track by elastic force of the elastic member through the cage.

2. A ball fixed type constant velocity joint comprising:

an outer joint member having a first curved guide groove axially formed in an inner spherical surface thereof;

an inner joint member having a second curved guide groove axially formed in an outer spherical surface thereof;

one torque transmitting ball disposed in one ball track defined by cooperation between the guide grooves;

a cage having one pocket for retaining the torque transmitting ball, an inner spherical surface thereof being in spherical contact with the outer spherical surface of the inner joint member, an outer spherical surface thereof being in spherical contact with the inner spherical surface of the outer joint member; and an elastic member interposed between the outer spherical surface of the cage and the inner spherical surface of the outer joint member, the elastic member elastically pushing the cage with respect to the outer joint member in a direction to swing the cage in a plane including an axis of the joint, wherein the centers of the guide grooves are offset axially by a same distance in opposite directions with respect to a joint center plane including the center of the torque transmitting ball, so that the ball track is wedge-shaped and gradually narrows toward one side in the axial direction, the torque transmitting ball in the pocket of the cage and the ball track being constantly elastically urged toward the narrow side of the ball track by elastic force of the elastic member through the cage.

3. A ball fixed type constant velocity joint comprising:

an outer joint member having curved guide grooves axially formed in an inner spherical surface thereof;

an inner joint member having curved guide grooves axially formed in an outer spherical surface thereof;

torque transmitting balls disposed one in each of a plurality of ball tracks defined by cooperation between each facing pair of corresponding guide grooves;

a cage having a plurality of pockets for retaining the torque transmitting balls, an inner spherical surface thereof being in spherical contact with the outer spherical surface of the inner joint member, an outer spherical surface thereof being in spherical contact with the inner spherical surface of the outer joint member; and an elastic member interposed between a bottom surface of one of the pockets of the cage and the torque transmitting balls, the elastic member elastically pushing at least one of the torque transmitting balls with respect to the cage, wherein the centers of the guide grooves are offset axially by the same distance in opposite directions with respect to a joint center plane including the centers of the torque transmitting balls, so that the ball tracks are wedge-shaped gradually narrowing toward one side in the axial direction, and wherein the torque transmitting balls in the pockets of the cage and the ball tracks are constantly elastically urged toward a narrow side of the ball tracks by elastic force of the elastic member acting thereto directly or through the cage.

4. A ball fixed type constant velocity joint comprising:

an outer joint member having curved guide grooves axially formed in an inner spherical surface thereof;

an inner joint member having curved guide grooves axially formed in an outer spherical surface thereof;

torque transmitting balls disposed one in each of a plurality of ball tracks defined by cooperation between each facing pair of corresponding guide grooves;

a cage having a plurality of pockets for retaining the torque transmitting balls, an inner spherical surface thereof being in spherical contact with the outer spherical surface of the inner joint member, an outer spherical surface thereof being in spherical contact with the inner spherical surface of the outer joint member;

an axial clearance for enabling the cage and the inner joint member to axially displace with respect to the outer joint member; and an elastic member comprising a split ring interposed between the outer spherical surface of the cage and the inner spherical surface of the outer joint member, the elastic member elastically pushing the cage and the inner joint member with respect to the outer joint member in an axial direction, wherein the centers of the guide grooves are offset axially by the same distance in opposite directions with respect to a joint center plane including the centers of the torque transmitting balls, so that the plurality of ball tracks are wedge-shaped and gradually narrow toward one side in the axial direction, and wherein the torque transmitting balls in the pockets of the cage and the ball tracks are constantly elastically urged toward a narrow side of the ball tracks by an axial displacement of the cage and the inner joint member with respect to the outer joint member due to elastic force of the elastic member.

5. A ball fixed type constant velocity joint comprising:

an outer joint member having curved guide grooves axially formed in an inner spherical surface thereof;

an inner joint member having curved guide grooves axially formed in an outer spherical surface thereof;

torque transmitting balls disposed one in each of a plurality of ball tracks defined by cooperation between each facing pair of corresponding guide grooves;

a cage having a plurality of pockets for retaining the torque transmitting balls, an inner spherical surface thereof being in spherical contact with the outer spherical surface of the inner joint member, an outer spherical surface thereof being in spherical contact with the inner spherical surface of the outer joint member;

an axial clearance for enabling the cage and the outer joint member to axially displace with respect to the inner joint member; and an elastic member comprising a split ring interposed between the inner spherical surface of the cage and the outer spherical surface of the inner joint member, wherein the elastic member elastically pushes the cage and the outer joint member with respect to the inner joint member in the axial direction, wherein the centers of the guide grooves are offset axially by the same distance in opposite direction with respect to a joint center plane including the centers of the torque transmitting balls, so that the ball tracks are wedge-shaped and gradually narrow toward one side in the axial direction, and wherein the torque transmitting balls in the pockets of the cage and the ball tracks are constantly elastically urged toward a narrow side of the ball tracks by an axial displacement of the cage and the outer joint member with respect to the inner joint member due to elastic force of the elastic member.

* * * * *